Patented Apr. 2, 1946

2,397,508

UNITED STATES PATENT OFFICE 2,397,508

HYDROXAMIC ACIDS

George F. Rouault, Whiting, Ind., and Herbert D. Rhodes, Chicago, Ill., assignors to Standard Oil Company, Chicago, Ill., a corporation of Indiana No Drawing. Application May 29, 1943,
Serial No. 489,074

4 Claims. (Cl. 260—500)

This invention relates to the manufacture of hydroxamic acids. More particularly it relates to the conversion of carboxylic acids into the corresponding hydroxamic acids by a novel process which is characterized by simplicity, high yields, high purity of products, and the production of material useful as antirust additive to turbine oils at extremely low concentrations. This process involves the conversion of a carboxylic acid to a corresponding alkyl ester and subsequent treatment of the latter with hydroxylamine and a neutralizing agent.

Hydroxyamic acids may be represented by the general formula

where R is an organic radical which may be alkyl, aryl, alkylated aryl, aralkyl, cycloparaffinic, cyclo-olefinic, or alkyl radicals substituted by a cycloparaffinic or cyclo-olefinic nucleus. Tautomeric with the hydroxamic acids are the hydroximic acids, whose structure may be represented by the general formula

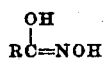

where R has the same significance as in the hydroxamic acid formula given above. The tautomers are unknown as separate bodies and can react as either structure, depending upon the reaction conditions.

It is an object of our invention to provide a new and improved process for the manufacture of hydroxamic acids on a commercial scale. Another object of our invention is to provide a process whereby esters of carboxylic acids can be converted to the corresponding hydroxamic acids in high yields. Still another object of our invention is the provision of a process for the production of hydroxamic acids wherein high volumetric efficiency of reaction equipment is obtained. Yet another object of our invention is to minimize the use of solvents both as purification and reaction media in the manufacture of hydroxamic acids. An additional object of our invention is to provide a process for the manufacture of hydroxamic acids which yields reproducible results and is characterized by high product yields. A further object of our invention is to provide a process for the conversion of carboxylic acids to hydroxamic acids in a well integrated and eminently practical series of two reactions, the product of which is a substance of high purity and very active as antirust additive to turbine oils at extremely low concentrations.

We have found that hydroxamic acid production proceeds smoothly and in high yields when hydroxylamine or a salt of hydroxylamine free of any solvent is added directly to a mixture comprising an alcoholic solution of an ester of a carboxylic acid and a quantity of a base at least sufficient to neutralize the reaction mixture is slowly added while the reaction mixture is cooled to prevent an undue rise in temperature. The reactions which proceed may be represented by the following equations, where HX represents an acid, MOH represents a base, and

an ester:

$$NH_2OH \cdot HX + MOH = NH_2OH + MX + H_2O$$

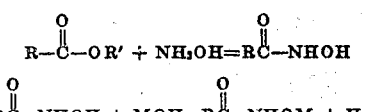

Although we have shown the use of a monobasic acid and a monoacid base in the above equations, it will be readily understood that we may use any acid and any base. Taking a specific case using $NH_2OH \cdot HCl$ and $NaOH$, with an ester $RCOOR'$, the products are

NaCl and water. Upon completion of this series of three reactions, which result in the formation of the hydroxamic-acid salt

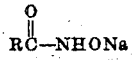

the reaction mixture is acidified to produce the hydroxamic acid according to the equation:

The acidification may be carried out with sulfuric acid, hydrochloric acid, or other strong inorganic or organic acids. In place of a salt of hydroxylamine we may use free hydroxylamine with consequent diminution of the amount of base necessary to neutralize the reaction mixture.

We have made the important discovery that a surprisingly small proportion of an alcohol initially present in the reaction mixture suffices to assure a homogeneous reaction medium. A reaction mixture consisting of about 50 parts by weight of ethyl naphthenate, about 5 parts of naphthenic acid, about 20 parts of ethyl alcohol, about 6.7 parts of hydroxylamine, about 18 parts by weight of sodium hydroxide, and about 18 parts by weight of water is homogeneous at 60° F. In our process we use a quantity of alcohol solvent for the ester which will assure the production of a substantially homogeneous reaction medium in the reaction with hydroxylamine. Our process is characterized by the use of a concentrated reaction solution which results in the utilization of reaction equipment at high volumetric efficiency. We prefer to avoid a large excess of alcoholic solvent over that quantity necessary to maintain a substantially homogeneous reaction solution.

Our process may be applied to any ester of a carboxylic acid. It may also be applied to substituted esters, containing halogen, nitro, hydroxy or other substituents that will not react with the hydroxylamine. Thus we may produce hydroxamic acids from esters of saturated or unsaturated aliphatic mono, di-, tri-, or higher carboxylic acids, or from aromatic carboxylic acids or from aliphatic carboxylic acids substituted by aromatic or cycloaliphatic radicals. Either neutral or acid esters of di- or higher carboxylic acids can be used. The esters may be used in substantially pure form or as natural or artificial mixtures.

We do not intend to imply that all esters of carboxylic acids can be converted to hydroxamic acids with equal facility and in identical yields by our process. Variations in yields and reaction rates will be noted with different members of a homologous series of esters as well as in comparisons made between esters of different homologous series. Our process can be applied with signal success to esters of naphthenic acid and such application constitutes a preferred embodiment of our invention.

Our invention may be applied to methyl, ethyl, n-propyl, isopropyl, n-butyl, isobutyl, tetriary butyl, amyl, hexyl, glycol, glyceryl and similar esters of naphthenic acids. Because of ease and economy of preparation we prefer to use methyl or ethyl esters of naphthenic acids.

In accordance with our invention an ester or mixture of esters of carboxylic acids is reacted with added free hydroxylamine or with a hydroxylamine salt in the presence of a base. Bases for the purpose of our invention are any materials which will neutralize hydroxylamine salts such as hydroxylammonium chloride, sulfate, etc. and hydroxamic acids. Such bases are sodium hydroxide, potassium hydroxide, barium hydroxide, calcium hydroxide, guanidine, tetra-alkyl-ammonium hydroxides, and the like, or the corresponding oxides. We may use either individual bases or their mixtures. The bases can be added to the reaction zone in the solid state, preferably as a powder, or in solution or suspension.

We can add free hydroxylamine, free of the solvent, to the reaction mixture, but prefer to use a salt of hydroxylamine. The addition of a base to the reaction mixture results in the liberation of free hydroxylamine in situ. Suitable salts of hydroxylamine include the hydrochloride, acid sulfate, sulfate, and nitrate, although other salts may be used.

Our preferred reaction solvent is an alcohol or a mixture of alcohols. Any one or more of a wide variety of alcohols can be used, including methanol, ethanol, propyl, butyl, amyl and higher alcohols; glycols, such as ethylene, propylene, butylene and amylene glycols; trihydric alcohols such as glycerin and alkyl substituted glycerins; higher polyhydric alcohols such as may be produced by the partial hydrogenation of monosaccharides. In general, we prefer to use monohydric aliphatic alcohols, especially methanol or ethanol.

The alcohols used as the solvent for the reaction mixtures of this invention may be the same as the alcohols liberated from the esters by reaction with hydroxylamine, or may be different. We have not found it necessary to use anhydrous alcohols, which are generally much more expensive than aqueous alcohols. For the purpose of our invention we may use aqueous alcohols containing 5, 10, 20 percent, or even more water. In general we prefer to use as concentrated an alcohol as may be readily obtainable in commercial practice, e. g. in the case of ethanol we prefer to use the 95% concentration.

The alcoholic reaction solvent of our invention is used in proportions sufficient at least to assure a homogeneous reaction medium in the reaction between the ester of the carboxylic acid and hydroxylamine. Depending upon the exact nature of the reactants and the alcoholic solvent chosen, the weight ratio of alcohol to esters may vary from about 0.3 to about 1. For example, when 95 volume percent ethanol is used as solvent in the reaction between ethyl esters of naphthenic acids and hydroxylamine, we can use about 0.3 to about 1 part by weight of ethanol per part of ester. The use of more alcohol than that necessary barely to render the reaction mixture homogeneous at about 40 to 60° F. is wasteful of solvent and causes the reaction to proceed at a slower rate than when the minimum amount is used.

We prefer to produce an alcoholic solution of an ester by esterifying the desired carboxylic acid with an excess of an alcohol preferably in the presence of a small proportion of an esterification catalyst, such as concentrated sulfuric acid or other mineral acid, under reflux.

The reaction mixture used for the esterification of the carboxylic acid can comprise about 20 to about 60 weight percent of carboxylic acids, about 20 to about 60 weight percent of ethanol (calculated as absolute ethanol) which may vary in concentration over the range of about 80 to about 100 percent by volume, and about 5 to about 40 weight percent of concentrated sulfuric acid. This mixture can be refluxed for a period of about 0.5 to 20 hours, depending on the acid strength.

Upon completion of the esterification the reaction mixture may be neutralized and may then be used as a suitable feed stock for conversion to hydroxamic acids. Alternatively, a mixture consisting predominantly of ester and alcohol may be separated from the esterification reaction mixture, e. g. by stratification, and used as the feed stock for the preparation of hydroxamic acids, with or without neutralization previous to the addition of hydroxylamine or a salt of hydroxylamine.

In accordance with our invention a salt of hydroxylamine and the desired ester or mixture of esters in an alcoholic solvent are vigorously stirred while a base is slowly added to the reaction mixture to liberate hydroxylamine, which is rapidly formed by the action of a base on such a hydroxylammonium salt. The hydroxylamine thus formed reacts slowly with the ester and excess neutralizing agent to form a salt of the corresponding hydroxamic acid. Alternatively, free hydroxylamine, in pure form or in solution, may be added to the reaction mixture instead of the hydroxylammonium salt. We prefer, however, to use a hydroxylammonium salt and liberate hydroxylamine in the reaction mixture. It is desirable to add free hydroxylamine or a salt thereof to the alcohol-ester solution, although the reverse order of addition can be used.

About 0.3 to about 2 mols of hydroxylamine or a salt thereof can be used per mol of carboxylic acid esters in the reaction mixture. However, we prefer to use substantially equimolecular proportions of ester and hydroxylamine or a salt of hydroxylamine. About 0.3 to about 4 equivalents of base can be used per equivalent of carboxylic acid ester in the reaction mixture. We prefer, however, to use 2 equivalents of base per equivalent of ester.

The reaction is exothermic and requires refrigeration to maintain a desirable temperature range. It is preferable to maintain the temperature of the reaction mixture between about 30° F. and 150° F. At temperatures below about 30° F. the reaction rates becomes excessively slow, while at temperatures above about 150° F. the yields of hydroxamic acids tend to be reduced and excessive refluxing may be necessary to maintain sufficient alcoholic solvent in the reaction zone.

After all the base has been added to the reaction mixture it is allowed to stand without stirring, or with occasional stirring, preferably at about 60° F., for a period of time sufficient to allow the reaction to proceed to equilibrium. It is generally desirable to allow the reaction mixture to remain in quiescent or semi-quiescent condition for a period of at least 20 hours, preferably about 70 hours or more.

The free hydroxamic acid can be generated from the reaction mixture by acidification. Acidification can be readily effected by the addition of dilute, e. g. about 5 to about 30 percent, aqueous mineral acids, such as sulfuric, hydrochloric, nitric acids or the like, or by the use of organic acids, e. g. glacial acetic acid, trichloroacetic acid or the like. Usually acid is added to the reaction mixture until it shows an acid reaction to litmus paper.

Upon acidification the crude hydroxamic acid generally separates from the reaction mixture as a separate stratum, which is withdrawn for purification.

Purification of crude hydroxamic acids may be variously effected; for example, by fractional dissolution in selective solvents; fractional crystallization; high vacuum fractional distillation; or by washing with solutions capable of dissolving the impurities therein. We have found that effective purification of crude hydroxamic acids may be effected by washing with dilute solutions of mineral salts. Thus, washing one volume of a crude hydroxamic acid with about 0.5 to about 2 volumes of about 1 to 5 weight percent NaCl solutions, preferably at about 120° to about 200° F., produces a product of sufficient purity for most practical purposes.

Hydroxamic acids as produced by the process described above generally contain a small proportion of emulsified and dissolved water. Emulsified water may be separated by heating; heating the hydroxamic acids for a short time on a steam bath results in the stratification of demulsified water, which may be readily separated. Emulsified water may also be removed from the hydroxamic acids by blowing with a stream of an inert gas, such as air, nitrogen and the like. Thus, blowing the hydroxamic acids with a gentle stream of air for about 30 minutes is sufficient to produce a bright, substantially dry hydroxamic acid. We prefer, however, to remove emulsified water from a hydroxamic acid by letting the product stand at room temperature for a period of from about 1 to about 7 days in a tank fitted with a bottom draw-off valve; water demulsified during this period of standing settles to the bottom of the tank, where it is drawn off.

In order to illustrate our invention, and not by way of limitation, the following examples are adduced. All parts are by weight except as otherwise stated. The naphthenic acids whose processing is described in the following examples were derived from petroleum by alkali extraction. Samples exhibited acidities varying from about 230 to about 240 expressed as milligrams of KOH per gram of sample; naphthenic acid content varied from about 80 to about 85 percent; equivalent weights were in the range of about 220 to about 230. The samples contained at most a trace of water.

Naphthenic acids are complex mixtures of carboxylic acids which occur naturally in various crude petroleum oils, usually in proportions below 1 percent, and may be extracted therefrom by the use of alkalies. Extensive research has demonstrated that petroleum naphthenic acids fall into at least three general categories: (1) aliphatic acids having the general formula $C_nH_{2n}O_2$ and predominating in compounds wherein $n$ is 6 or 7, (2) acids having the general formula $C_nH_{2n-2}O_2$ and shown to be cyclopentane derivatives $C_5H_9(CH_2)_xCO_2H$, where $x$ generally varies from 1 to about 4 and wherein the cyclopentane ring may also contain one or more alkyl groups, (3) acids having the general formula $C_nH_{2n-4}O_2$, known to contain a bicyclic cycloaliphatic nucleus and containing about 12 to about 25 carbon atoms. The above classification presents a somewhat oversimplified picture. Some evidence has been adduced of the existence of even more complex acids in petroleum naphthenic acids, including tri- and tetra-cyclic cycloaliphatic substituted aliphatic carboxylic acids. There is evidence that the molecular weights in the above classes overlap; thus, although the simple aliphatic acids predominate in $C_6$ or $C_7$, small proportions of higher molecular weight fatty acids also occur and overlap into the molecular weights and boiling ranges of compounds falling into categories (2) and (3) above. Naphthenic acids obtained from different crudes and from various fractions of the same crude oil generally differ from each other to some extent in composition and character. Our process for the preparation of hydroxamic acids is particularly applicable to mixtures of naphthenic acids having molecular weights in the range of about 110 to about 350.

*Example 1*

A homogeneous solution was prepared by mixing 41 parts of 95% ethanol and 50 parts of petroleum naphthenic acids. Pure colorless concentrated sulfuric acid (9 parts) was added to the solution and the mixture was shaken, becoming homogeneous and hot. The solution was refluxed for 2.25 hours at a liquid temperature of 192° F. Upon completion of the refluxing, the mixture was allowed to cool overnight. Thereafter 17 parts of 50% aqueous sodium hydroxide solution was added to neutralize the sulfuric acid in the reaction mixture. During neutralization the temperature of the mixture rose to 146° F. The mixture, containing some solid salt, was cooled to 66°

F. in tap water. Hydroxyl-ammonium acid sulfate (33 parts) was added in slush and lump form. Eighty-two parts of 50% aqueous sodium hydroxide solution was added over a period of about 30 minutes with vigorous stirring and cooling. The mixture was stirred for a period of 19.5 hours. The reaction mixture was then mixed with small proportions of water and about 29 parts of 50% sulfuric acid and allowed to stratify. The reddish-brown naphthen-hydroxamic acid product was washed with hot water and was then heated on a steam bath to demulsify the water emulsified therein. The residue was about 42 parts of a dark brown liquid that had about the same color as the naphthenic acids used as starting material. The product was obtained in 93% of the theoretical yield and gave a deep wine-red color with ferric sulfate solution in dilute aqueous alcoholic solution.

Example 2

A mixture of 2270 parts of naphthenic acids, 1850 parts of recovered 95% ethanol and 42 parts of concentrated sulfuric acid (specific gravity 1.84) was refluxed for 2.25 hours. After overnight cooling the mixture was neutralized by the addition of 760 parts of 50% aqueous sodium hydroxide solution, which was dropped into the stirred mixture over a period of about one hour, with cooling. During neutralization, the temperature of the mixture did not exceed 64° F. Granular hydroxylammonium chloride (694 parts) was then added. 50% aqueous sodium hydroxide solution (2100 parts) was added over a period of about 100 minutes, during which time the mixture was vigorously stirred and cooled. The temperature of the mixture during this period was about 63° F. Stirring was effected by means of a propeller-shaped stirrer rotating at the rate of about 4 revolutions per second. The reaction vessel was constantly cooled by heat exchange with cold water. The reaction mixture was allowed to remain quiescent for about 70 hours and was thereafter acidified by the addition of about 5000 parts of 15.5 weight percent sulfuric acid, with stirring. The highest temperature reached during acidification was 112° F. A lower aqueous layer was drawn off from the naphthenhydroxamic-acid layer, which was then stirred for several minutes with about 4000 parts of a warm one percent by weight solution of sodium chloride in water, after which the lower layer was drawn off. Washing of the naphthenhydroxamic acid was concluded by stirring for five minutes with two portions of one percent by weight aqueous sodium chloride solution at 136° F., each of which constituted about 4000 parts by weight of the reaction mixture. It was found that the naphthenhydroxamic acid layer separated quite well from the aqueous layer in five minutes. The product can be dried by blowing with a gentle stream of air; this treatment greatly increases the brightness of the product.

Example 3

A mixture of 75 parts of naphthenic acids having an average molecular weight of 229, 94 percent ethanol (61 parts) and 14 parts of concentrated sulfuric acid was refluxed for 2.5 hours in a glass-lined kettle, the liquid temperature being 190° F. The mixture was then allowed to cool and stratify overnight. The lower layer was drawn off and discarded. The upper layer was stirred vigorously with 21 parts of hydroxylammonium chloride in a jacketed iron mixing kettle while about 27 parts of 48° Baumé aqueous sodium hydroxide solution was added over a period of about 18 hours. The temperature of the reaction mixture was maintained at a temperature in the range of about 60 to about 65° F. by means of indirect heat exchange with cold water for about 70 hours, including the time during which the sodium hydroxide was added. Twenty-two and two-tenths parts of concentrated sulfuric acid (specific gravity 1.84) was added to 125 parts of water, the resulting solution was allowed to cool to room temperature and then added to the reaction mixture with vigorous stirring. One-half hour was allowed for stratification of the reaction mixture, and the lower aqueous layer was drawn off and discarded. The upper layer, crude naphthenhydroxamic acid, was stirred vigorously with 127 parts of 1.6 weight percent aqueous sodium chloride added at a temperature of about 130° F. Stratification was allowed to take place over a period of 30 minutes and the lower aqueous layer was drawn off and discarded. The crude product was again washed with a dilute, warm sodium chloride solution, as described above. The washed naphthenhydroxamic acid was then allowed to stand for 5 days at room temperature. At the end of this time, demulsified water was drawn off, leaving 75 parts of naphthenhydroxamic acid product which was used directly as an antirust additive to turbine oil and which contained about 65 percent by weight of naphthenhydroxamic acids.

Example 4

A mixture of petroleum naphthenic acids was esterified as in Example 2, using the same parts by weight. Upon completion of the esterification reaction, the mixture was cooled to about 50° F. and a lower aqueous layer was separated from the top layer, which contained substantially all the ethyl naphthenates. The top layer was mixed with hydroxylammonium chloride (694 parts) and 1850 parts of 50 percent aqueous sodium hydroxide solution was added to the rapidly stirred mixture over a period of 90 minutes. The reaction mixture was well cooled by indirect heat exchange with cold water. The highest temperature reached by the reaction mixture during the addition of the sodium hydroxide solution was 70° F. and the average temperature was about 60° F. The mixture was allowed to warm to room temperature and was stirred again. At the end of twenty-four hours of standing the mixture was again shaken to insure completeness of mixing. After the reaction mixture had stood for about seventy hours, it was a light tan semi-solid mixture covered with froth and only one liquid phase was present. This product, which was of about the same consistency as soft soap, was a mixture of the sodium salts of naphthenhydroxamic acids. The sodium salts were acidified by the addition of about 4000 parts by weight of 15.5 weight percent sulfuric acid solution. The temperature of the mixture during acidification was about 100° F. The lower, aqueous layer was drawn off, and the top layer was washed three times with 4000-part portions of one weight percent sodium chloride solution at 100° F. The layers of aqueous solution and product separated well in a few minutes. The product was allowed to stand for a few hours to demulsify water emulsified therein and the demulsified water was then removed by siphoning. 2140 parts of the main product were obtained and an additional 103 parts of the product were recovered from the aqueous sodium chloride washings. The total yield of crude naphthenhydroxamic acids was 93 percent of theoretical. The product recovered from the washings can be most advantageously worked up with the next batch of main product. A dilute aqueous alcoholic solution of this reaction product gave a deep wine-red color with ferric sulfate solution.

*Example 5*

A mixture of 50 parts of naphthenic acids having a neutralization equivalent of 229, 41 parts of 95 volume percent ethanol and 9 parts of concentrated sulfuric acid (specific gravity 1.84) was refluxed for 2 hours. Upon cooling to room temperature two strata were formed in the mixture of esterification products. The upper stratum was stirred vigorously with 29 parts of hydroxylammonium acid sulfate. Fifty percent aqueous sodium hydroxide (53 parts) was added, with cooling, over a period of 40 minutes, during which time the temperature of the reaction mixture was maintained in the range of about 60 to about 80° F. The reaction mixture was allowed to stand for three days and was then acidified and purified in the manner described in Example 3.

Hydroxamic acids are known to be effective as inhibitors when added in small proportions to lubricating oils, turbine oils, transformer oils and the like. We have found that naphthenhydroxamic acids produced by the process of our invention give perfect protection against rusting at 0.002 weight percent concentration at 167° F. in a technical white oil having a viscosity at 100° F. in the range of 140 to 145 seconds Saybolt Universal in a modification of the tentative Method of test for rust preventing characteristics of steam-turbine oil in the presence of water, D665-42T, published in A. S. T. M. Standards (1942), Part III, Nonmetallic materials—General, pages 969 to 972. Nearly perfect protection was obtained at a naphthenhydroxamic-acid concentration of 0.001 weight percent under otherwise identical testing conditions. Naphthenhydroxamic acids prepared by conventional procedures fail to give adequate rusting protection at concentrations below 0.010 weight percent in this technical white oil under the conditions of the above test.

It will be apparent that we have provided a novel and useful process for the manufacture of hydroxamic acids. Our process is especially adaptable to the manufacture of naphthenhydroxamic acids. Further, our process is applicable to large-scale production of hydroxamic acids and is characterized by simplicity of operation, high yields, high product purity, and a product useful as antirust additive to turbine oils at extremely low concentrations.

We claim:

1. In the manufacture of a naphthenhydroxamic acid the improvement which comprises adding a solvent free compound selected from the class consisting of hydroxylamine and salts of hydroxylamine to a mixture comprising an ester of a naphthenic acid and an alcohol, the weight ratio of said alcohol to said ester being in the range of about 0.3 to about 1, and thereafter adding at least a neutralizing quantity of a base to the resultant mixture.

2. In the manufacture of naphthenhydroxamic acids, the improvement which comprises adding a solvent free compound selected from the class consisting of hydroxylamine and salts of hydroxylamine to a mixture comprising an ester of a naphthenic acid and an alcohol, the weight ratio of said alcohol to said ester being in the range of about 0.3 to about 1, adding at least a neutralizing quantity of a base to the resultant mixture while maintaining a temperature below about 150° F., separating the naphthenhydroxamic acid salt and acidifying said salt to liberate a naphthenhydroxamic acid.

3. In the manufacture of naphthenhydroxamic acids, the improvement which comprises adding a solvent free compound selected from the class consisting of hydroxylamine and salts of hydroxylamine in a proportion between about 0.3 and about 2 mols per mol of ester to a mixture comprising an ester of a naphthenic acid and ethanol, the weight ratio of said ethanol to said naphthenic acid being in the range of about 0.3 to about 1, adding at least a neutralizing quantity of a base to the resultant mixture while maintaining a temperature below 150° F., separating a naphthenhydroxamic salt and acidifying said salt to liberate a naphthenhydroxamic acid.

4. The process of claim 3 wherein the molecular weight of the naphthenic acid is in the range of about 110 to about 350.

GEORGE F. ROUAULT.
HERBERT D. RHODES.